United States Patent [19]
Haynes

[11] 3,786,989
[45] Jan. 22, 1974

[54] TRACTION MAT FOR AUTOMOBILES

[76] Inventor: Lincoln W. Haynes, 71 Raporeda Rd., Wilmington, Vt.

[22] Filed: Dec. 23, 1971

[21] Appl. No.: 211,220

[52] U.S. Cl. ............................................. 238/14
[51] Int. Cl. ........................................ E01b 23/00
[58] Field of Search ...................... 238/14; 118/425

[56] References Cited
UNITED STATES PATENTS
2,443,319   6/1948   Mack .................................... 238/14
3,202,358   8/1965   Griswold ............................... 238/14

*Primary Examiner*—Gerald M. Forlenza
*Assistant Examiner*—Richard A. Bertsch
*Attorney, Agent, or Firm*—H. Gibner Lehmann

[57] ABSTRACT

A traction mat for placement beneath the driving wheel of an automobile disabled on an ice- or snow-covered road. The mat comprises an inexpensive, one-piece, expendable elongate flat sheet of expanded metal such as metal lath, having a substantially rectangular shape and characterized by a plurality of slit portions formed by transverse slits in the metal. The sheet has a pair of opposite, longitudinal edge or margin portions formed by cutting across the sheet. This normally would result in a plurality of sharp protrusions which are formed by the cutting. To prevent injury to the user and daage to surrounding objects from scratching by the protrusions, a plastic substance is applied to the sharp protrusions, preferably by dipping the latter into a bath of plastic in a molten state and allowing the plastic substance to solidify, whereby the protrusions become coated with beads or globules of plastic.

1 Claim, 5 Drawing Figures

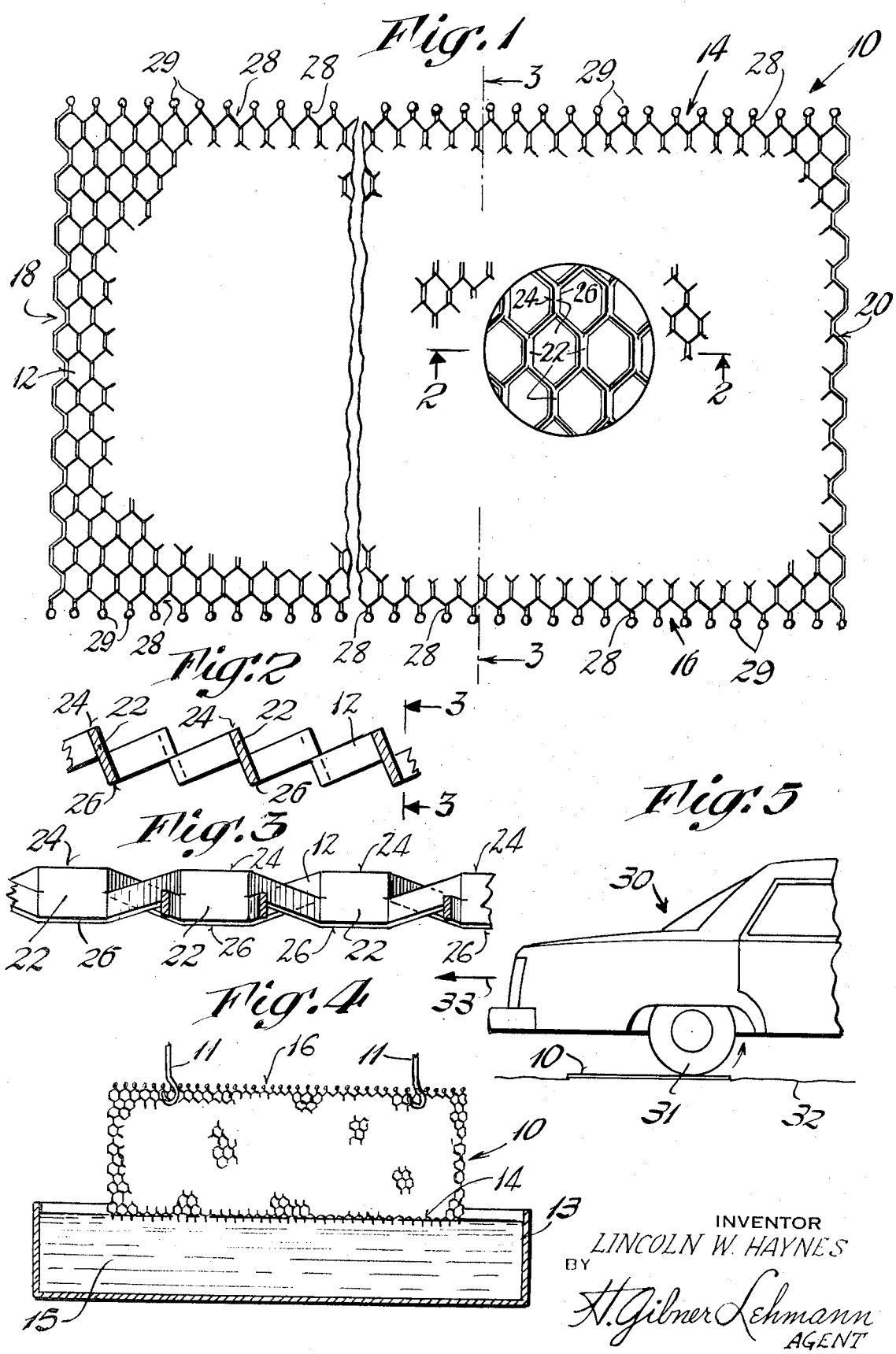

TRACTION MAT FOR AUTOMOBILES

No Cross References to Related Applications

BACKGROUND

This invention relates to wheel traction mats for automobiles which have become disabled on ice- or snow-covered roadways. In the past a number of anti-skid devices have been proposed and constructed to improve the traction of the driving wheels of an automobile on icy or snow-covered pavements. Also, anti-skid liquid materials have been developed and sold in spray-type aerosol cans, the liquid being applied to the wheel so as to form a coating thereon, thereby providing a greater coefficient of friction with icy surfaces than that provided by the wheel alone. Some anti-skid mats have been constructed from chain mesh of varying sizes and configurations. Metal reinforced sheeting has frequently been employed often including on the sheeting an abrasive or grit-like coating to provide traction between the mat and pavement on the one hand, and the driving wheel and mat on the other hand. In addition, various techniques have been employed to enable the mat to conform to the surface of a rut or trench into which an automobile tire has become lodged. Segmented mats having a number of small individual links or band elements bolted or otherwise fastened together are known in the art. The points at which such links are fastened together serve as hinges to permit a high degree of flexibility. Fairly rigid mats have also been proposed and developed, intended to be wedged in between the wheel of a disabled vehicle and soft terrain such as snow-covered roadways, muddy fields, and the like. Such mats have included substantially flat types, having longitudinally extending supporting members welded or otherwise fastened to a traction grating or biting metal surface. Still other rigid types have included wedge-shaped devices which are adapted to be driven into soft ground adjacent the underside of the wheel for frictional contact therewith to provide a greater degree of traction.

The use of expanded metal for traction mats is known in the art. Previous devices have employed a number of individual expanded metal sheets of small size fastened together by rings or hinges to permit folding during storage.

The above prior devices have met with varying degrees of success in use. Friction-creating liquids dispensed in aerosol cans have provided only minimal increase in traction, for short time intervals. Prolonged "spinning" of a wheel to which such a liquid has been applied will cause a "wash-off" of such a liquid, requiring frequent re-application by the user. Many of the prior anti-skid traction mats which have been proposed were bulky and heavy, as in the case of the rigid mats hereinabove mentioned, rendering them difficult to handle and use, as well as inconvenient to store in the trunk of an automobile. Mats constituted of chain mesh or of a number of hinged links were often very flexible and difficult to place in the desired location adjacent to, and in proper alignment with the wheel. Due to the fact that the fabrication cost of such anti-skid mats in the past has been substantial, it has been inconvenient and expensive to the consumer to replace such articles when, due to deterioration or damage from normal wear and abuse, they become ineffective or unusable. In addition, frequently the prior mats were unsatisfactory in that they did not provide comparable traction between the wheel and one mat surface, and the road and the opposite mat surface. In such cases, the wheel would "spin" the mat out from beneath it, thus requiring a re-placement of the mat. Finally, in subzero temperatures on smooth ice, certain of the mats did not supply sufficient traction to provide satisfactory results.

Due to the nature of expanded metal, prior mats constructed therefrom inevitably had a number of sharp metal protrusions along the edges where the metal sheet was cut. While the presence of these sharp protrusions did not materially affect the performance of the mats as traction devices, such protrusions presented a potential hazard to the user, possibly causing scratches and puncture wounds, and presenting potential danger to the user's eyes. In addition, during storage, such protrusions were prone to become "caught" on surrounding objects such as blankets, cloths, clothing and the like. Further, such prior mats were bulky, and also too costly to be treated as expendable, or to be bought and stored in useful quantities for the time of emergency.

SUMMARY

The above drawbacks and disadvantages of prior traction mat devices are overcome by the present invention which has for one object the provision of a novel and improved traction mat for automobiles, which is especially simple in construction and economical to fabricate, while at the same time providing an effective means for enabling an automobile which has become disabled on a slippery road surface or on muddy terrain to pull out under its own power.

The above object is accomplished by a mat structure consisting essentially of a simple, inexpensive, one-piece substantially rectangular sheet of expanded metal, such as metal lath, presenting a multiplicity of sharp cutting edges at both faces. The mat has a pair of opposite longitudinal edge portions formed during the cutting of the sheet. Due to the nature of the expanded metal, a plurality of sharp protrusions are left along both longitudinal edges following the cutting. The protrusions are covered with beads or globules of a plastic substance, applied to the edge portions by successive dipping of the edge portions into a bath containing the plastic substance in molten state. Upon removal from the bath, the sharp protrusions are covered with a coating of the plastic which rapidly solidifies and provides bead-like enclosures for the protrusions, thus lessening the likelihood of injury to the user due to the scratches or lacerations resulting therefrom. Additionally, the bead-like coating lessens the tendency for the mat to become caught upon articles of clothing and the like.

By the use of expanded metal constituted as a single integral piece, the mat has at one and the same time very efficient, sharp cutting traction edges on both faces, said edges being sloped at such an angle with respect to the plane of the sheet as to enable the latter to bite into hard, frozen ice as well as into other types of softer bases. The mat is of such simple construction and is sufficiently economical to produce as to enable the user to purchase a supply in the form of a number of sets of mats, and to discard a mat after it has been used several times or even once if need be, due to deterioration, or less of shape, damage, etc. The mats are biodegradable whereby their rusting if abandoned would not cause a serious litter problem, nor cause accidents if left on the road.

Other features and advantages will hereinafter appear.

In the drawings:

FIG. 1 is a top plan view of a traction mat as provided by the present invention.

FIG. 2 is a longitudinal section of the mat taken along line 2—2 of FIG. 1.

FIG. 3 is a transverse section of the mat taken along line 3—3 of FIG. 1.

FIG. 4 is an illustration of the method of application of the plastic coating to the sharp protrusions along the edge portions of the mat.

FIG. 5 is an illustration of the use of the traction mat placed between a driving wheel of an automobile and a section of icy or muddy terrain.

In accordance with the present invention, referring to FIG. 1, there is illustrated a simple and inexpensive, unitary, one-piece expendable or disposable traction mat 10, comprising a short length of expanded sheet metal 12 having a pair of opposite longitudinal edge portions 14 and 16, and a pair of opposite transverse end portions 18 and 20, the end portions having unbroken and continuous edges. The expanded metal sheet is provided with a multiplicity of slit portions 22, disposed at an acute angle with respect to the plane of the sheet 12, several of said slit portions being shown in FIG. 2. Each of the slit portions 22 is provided with a pair of opposite, sharp, cut edges 24 and 26 respectively, the corresponding edges of the slit portions facing outward at opposite sides of the sheet. The edges facing out at one side of the sheet are adapted to engage a driving wheel of an automobile, while the edges facing out at the other side of the sheet are adapted to engage the surface of an ice-covered roadway or muddy terrain.

The expanded metal sheet 12 has a plurality of sharp cut protrusions 28 along each of the opposite longitudinal edge portions 14 and 16. The protrusions 28 are formed during the cutting of the sheet from a larger supply. Referring to FIG. 4, after cutting, the sheet may be supported by suitable means 11 and gently lowered into a tank 13 containing a molten synthetic plastic substance 15, to cause one longitudinal edge 14 of the sheet to become submerged therein. Upon removal from the tank, the sharp protrusions 28 along the longitudinal edge will have a coating of the molten plastic substance 15 which quickly solidifies, forming a globule or bead 29 around each protrusion. Similarly, the other longitudinal edge 16 may be dipped into the tank 13 containing the liquid plastic 15 to a depth sufficient to cover the longitudinal edge 16, and then removed therefrom, allowing the plastic to solidify so as to form a globule or bead 29 around each protrusion of the other longitudinal edge 16.

FIG. 5 illustrates the use of the present improved traction mat in conjunction with an automobile 30 which has become disabled on slippery terrain 32. Assuming the automobile drive wheel to be rotating in the direction indicated by the arrow adjoining the wheel in FIG. 5, the traction mat may be placed in alignment with the wheel 31 and immediately behind it. With the wheel 31 turning slowly, the transverse edge portion of the mat will wedge between the wheel and the terrain, until the wheel comes into contact with several of the sharp, cut edges 24, at which point the mat 10 will be drawn into the area between the wheel and the terrain 32 roughly to the position shown in FIG. 5. Once the mat is in this position, the automobile 30 usually can move out under its own power in the direction indicated by the arrow 33, by careful and slow spinning of the wheel 31. In cases where both driving wheels of an automobile are lacking in traction with the terrain, a separate mat may be placed adjacent each of the driving wheels in the manner mentioned above to provide improved traction for both wheels.

The improved traction mats of the invention as described above can be readily sold in packages of 2, 6 or 12. Under certain circumstances, as where there is a sizeable area of slippery terrain to be covered, a series of traction mats can be placed end-to-end along a desired path in alignment with the driving wheels to offer substantially more than just "temporary" traction, as would be the case if a single mat were used.

After the automobile has been extricated, the mat 10 can be retrieved for further use on a subsequent occasion, or it can be discarded near the location where it was used. The mat is sufficiently inexpensive to produce and sell to make a one-time use thereof feasible. The material used in the expanded metal sheet can be iron, steel, or alloys thereof which would be quickly subject to rust and degenerateon rapidly in the presence of water. The ability of a mat to deteriorate rapidly in the presence of moisture would be advantageous in the case where a "one-time" use of the mat is contemplated. Or, the mat 10 can be plated by any suitable process to resist rust, if this is desired as for example in cases where there is to be long shelf life or storage.

It can be seen from the foregoing that I have provided an improved, especially effective traction mat which is simple and safe to use, economical to produce and inexpensive to sell.

Variations and modifications are possible without departing from the spirit of the invention.

I claim:

1. A traction mat for placement beneath a driving wheel of an automobile disabled by slippery road conditions, comprising in combination:
    a. a unitary, one-piece, elongate sheet of expanded sheet metal of substantially rectangular shape, having a multiplicity of slit portions formed by traverse Slits, each of said slit portions having a pair of sharp-cut edges respectively presented at opposite sides of said sheet, the edges at one side being adapted for engagement with an icy road surface and the edges at the other side being adapted for engagement with the driving wheel of the automobile, said sheet having a pair of opposite longitudinal edge portions formed by cutting across the sheet, forming thereby a plurality of sharp-cut protrusions defining said edge portions; and
    b. encapsulating means for covering said protrusions along said longitudinal edge portions of the sheet with a protective layer of material which is relatively soft to the user's touch, said encapsulating means comprising protective beads disposed along the opposite longitudinal edge portions of said sheet, said beads being adhered to said metal protrusions and enclosing the sharp-cut edges thereof and said beads comprising globules of synthetic plastic substance adhered to said protrusions by dipping the latter into the plastic substance while said plastic substance is in a molten state.

* * * * *